United States Patent
Sakashita

(10) Patent No.: US 6,466,867 B1
(45) Date of Patent: Oct. 15, 2002

(54) VEHICULAR NAVIGATION SYSTEM

(75) Inventor: Naohiro Sakashita, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/526,112

(22) Filed: Mar. 15, 2000

(30) Foreign Application Priority Data

Mar. 18, 1999 (JP) .......................................... 11-074024

(51) Int. Cl.$^7$ ................................................ G06G 7/78
(52) U.S. Cl. ........................ 701/211; 701/209; 701/210
(58) Field of Search ................................ 701/207, 208, 701/209, 210, 211, 117; 340/988, 990, 995; 73/178 R

(56) References Cited

U.S. PATENT DOCUMENTS

| | | | | |
|---|---|---|---|---|
| 5,452,217 A | * | 9/1995 | Kishi et al. | 701/207 |
| 5,905,451 A | * | 5/1999 | Sakashita | 340/988 |
| 6,058,350 A | * | 5/2000 | Ihara | 701/208 |
| 6,064,941 A | * | 5/2000 | Nimura et al. | 701/210 |
| 6,101,443 A | * | 8/2000 | Kato et al. | 701/210 |
| 6,108,604 A | * | 8/2000 | Fukaya et al. | 701/211 |

FOREIGN PATENT DOCUMENTS

| | | |
|---|---|---|
| JP | 62-88099 | 4/1987 |
| JP | 8-292050 | 5/1996 |
| JP | 8-334352 | 12/1996 |

\* cited by examiner

*Primary Examiner*—Jacques H. Louis-Jacques
(74) *Attorney, Agent, or Firm*—Law Offices of David G. Posz

(57) ABSTRACT

A navigation system, which can detect particular intersection as the intersection to be guided, even if the particular intersection is not judged as the intersection to be guided in a the Following-the-road judgment. A navigation system includes ECU, which mainly performs a following-the-road judgment and a ramp judgment. In the following-the-road judgment, the ECU determines the particular intersection as the intersection to be guided, when a continuity of the travel road is not secured before and after the intersection. In the ramp judgment, the ECU determines the particular intersection as the intersection to be guided, when the particular intersection is a branch point to an off-ramp, and when there is a merge point within a predetermined distance ahead from the branch point, and further when the recommended guidance route is set so that the vehicle keeps on traveling on the main lane. As a result, the ECU can adequately perform the travel guidance, even if the road has a unique shape such that the branch point is provided close to the merge point and the number of the lanes is increased only between the merge point and the branch point.

10 Claims, 5 Drawing Sheets

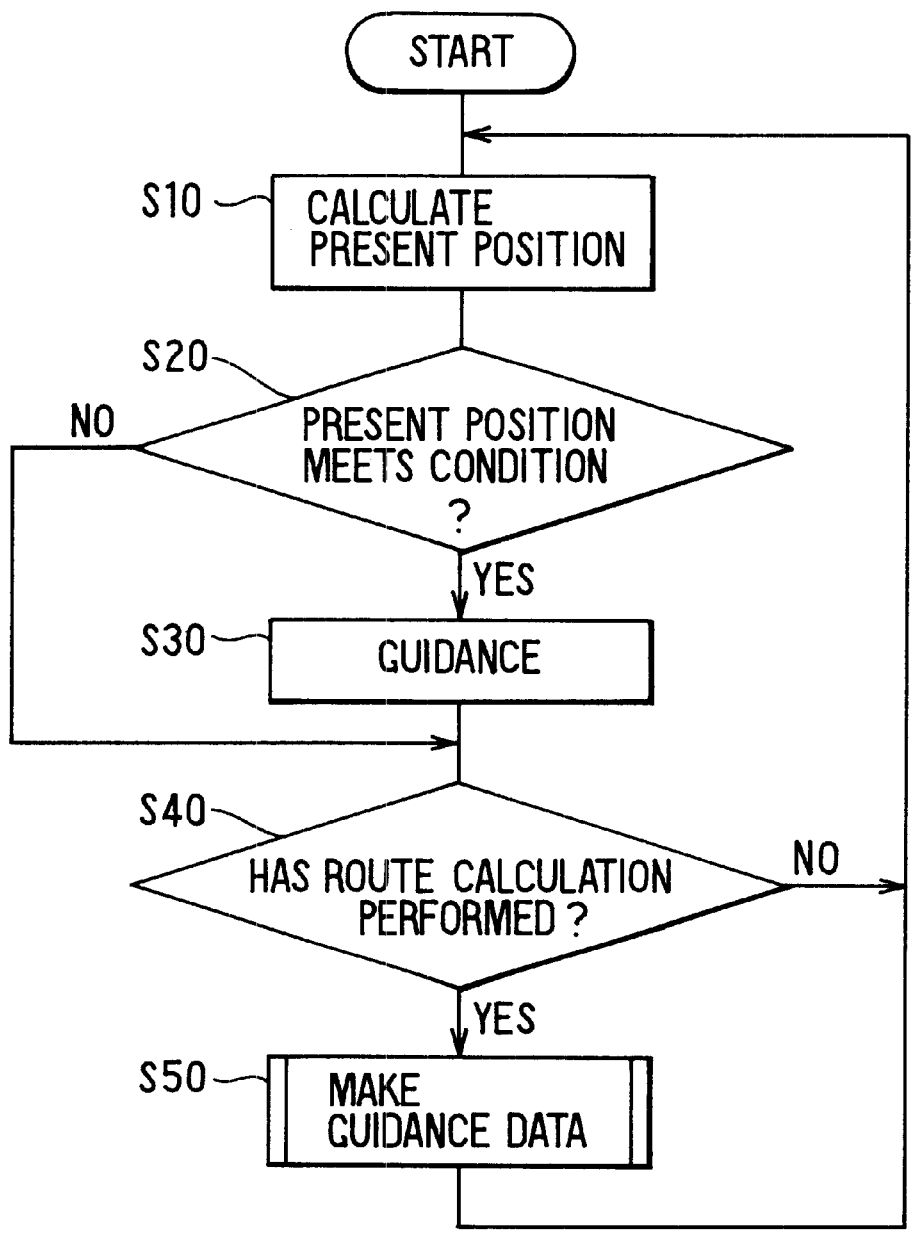

US 6,466,867 B1

VEHICULAR NAVIGATION SYSTEM

CROSS REFERENCE TO RELATED APPLICATION

This application is based upon Japanese Patent Application No. Hei. 11-74024 filed on Mar. 18, 1999, the contents of which are incorporated herein by reference.

BACKGROUND OF THE INVENTION

1. Field of the Invention

This invention relates to navigation systems, and particularly to a vehicular navigation system which performs travel guidance regarding an intersection existing on a recommended guidance route when a vehicle approaches the intersection.

2. Related Art

Various navigation apparatuses for adequately guiding a vehicle to a destination, by detecting a present position of the vehicle by using a GPS or the like and by displaying the present position on a display with a road map,have been proposed. Furthermore, the other navigation apparatuses for setting an adequately route (a recommended guidance route) from the present portion to the destination and for performing route guidance have been proposed.

In this kind of navigation apparatus, some apparatuses perform travel guidance with voice sound regarding an intersection existing on a recommended guidance route when a vehicle approaches the intersection. For example, some apparatuses guide using both a distance to the intersection and a direction to be turned, with verbal instructions such as "After ○○ meters, please turn right". Furthermore, some apparatuses further guide with respect to a name of the intersection, with verbal instructions such as "After ○○ meters, please turn left at intersection of □□." It is convenient for the user when the navigation apparatus timely notifies with verbal instructions, because the user does not need to pay attention to the relationship between the present position and the intersection.

In this case, the intersection to be guided means not all the intersections existing on the recommended guidance route, but only particular intersections at which the user may deviate from the recommended guidance route if there is no guidance regarding the direction to be turned. Therefore, this kind of apparatus basically performs "Following-the-road judgment", which judges whether the vehicle turns at the particular intersection or not, with respect to each of the particular intersection.

However, it cannot always say that it is not "Following-the-road" when a road shape is merely curved. For example, when a narrow side road is connected to a wide main road at a point of the main road where the main road is about to curve, a route along the main road can be called "Following-the-road." From a standpoint of the user, he/she merely continues to travel a road on which he/she has been traveled. Therefore, the apparatus performs the "Following-the-road judgment" by largely considering a fact whether a continuity of the road is secured between before and after the intersection. When the continuity is not secured, the apparatus regards this situation as not "Following-the-road", and decides the intersection as the intersection to be guided.

For example, as shown in FIG. 6, it is assumed that a vehicle travels a main lane of a highway or an automobile specialized road, and that there is an on-ramp or an off-ramp connected to an interchange (IC), a service area (SA) or a parking area (PA). In this case, according to a conventional navigation apparatus, a branch point at which the off-ramp is connected to the main lane and a merge point at which the on-ramp is connected to the main lane are not regarded as the intersection to be guided. In other words,when there recommended guidance route is determined so that the vehicle travels along the main lane, but does not travel to the off-ramp, the conventional navigation apparatus does not perform the travel guidance, because this condition is actually the, "Following-the-road." This is because it is confusing for the user when the travel guidance is performed at every time he/she approaches the IC, the SA or the PA, although he/she does not intend to deviate from the main lane. Here, some conventional navigation apparatus performs the guidance with voice sound such as "About 5 kilometers ahead, you will find a SA (or a PA) " to inform the user of an existence of the SA or PA, however, this type of navigation apparatus simply informs the existence thereof. Therefore, such guidance is performed ahead of some kilometers (e.g., 5 kilometers). Further explanation regarding this type of navigation apparatus is omitted, because this is another technical field from the travel guidance to be pointed out as a problem.

However, when the travel guidance is not performed as a result of a decision that it is the "Following-the-road" in the conventional Following-the-road judgment, the user may become confused because the road has a unique shape. An example of such a unique-shaped road will be explained with reference to FIGS. 2A and 2B.

As shown in FIG. 2A, when a merge point, at which an on-ramp from the SA or the PA is merged (connected) with a main lane, is provided close to a branch point, at which an off-ramp to the IC or the SA is branched from the main lane, it can be thought that the number of lanes is increased only between the merge point and the branch point. Here, as shown in FIG. 2B, in general, the number of lanes is increased only for a predetermined distance from the merge point to smoothly merge traffic; and the number of lanes is also increased only for a predetermined distance before the branch point to smoothly branch the traffic. As a result, when the merge point is provided close to the branch point, the increased lane is continuously provided. Actually, this type of road is seen in Europe.

Normally, the road has a shape so that traffic on the increased lane is automatically merged to the main lane (the temporarily increased lane is decreased again). However, according to the above-described example, since the number of lanes is not decreased, the vehicle may keep on traveling on the increased lane. Of course there is no problem if the user is well acquainted that he/she travels on such a unique road. Therefore, it is preferable for a vehicular navigation system to perform the travel guidance even if the road on which the user travels has such a unique shape.

Although FIG. 2A is a typical example of the unique shaped-road, it can be though that it needs to perform some travel guidance even if the user travels the unique shaped-road, which is not regarded as the intersection to be guided in the regular Following-the-road judgment due to its unique shape.

SUMMARY OF THE INVENTION

This invention has been conceived in view of the background thus far described and its first object is to improve usefulness of route guidance.

Its second object is to improve usefulness of route guidance, so that among intersections, which are not regarded as the intersections to be guided in the Followingthe-road judgment, a particular intersection to which travel guidance is to be performed can be adequately judged as the intersection to be guided.

According to the present invention, following-the-road judgment means judges whether a continuity of a travel road is secured before and after the intersection when a vehicle passes through a particular intersection existing on a recommended guidance route, and determines the particular intersection as an intersection to be guided when the continuity of the travel road is not secured. Even when the particular intersection is not determined as the intersection to be guided by the following-the-road judgment means, ramp judgment means determines the particular intersection as the intersection to be guided, when the particular intersection is a branch point at which an off-ramp is connected to a main lane to divide traffic on the main lane to the off-ramp, and when there is a merge point at which traffic is merged to the main lane within a predetermined distance ahead from the branch point, and further when the recommended guidance route is set so that the vehicle keeps on traveling on the main lane. Travel guidance performing means performs travel guidance regarding the intersection to be guided, which is determined by one of the following-the-road judgment means and the ramp judgment means, when the vehicle approaches the intersection to be guided.

According to the above-described structure, since the ramp judgment means judges as the above ways, the travel guidance is adequately performed to the branch point, which is not judged as the intersection to be guided only by the "Following-the-road judgment".

According to another aspect of the present invention, even when the particular intersection is not determined as the intersection to be guided by the following-the-road judgment means, the ramp judgment means determines the particular intersection as the intersection to be guided, when the particular intersection is a branch point at which an off-ramp is connected to a main lane to divide traffic on the main lane to the off-ramp, and when the number of lanes including the main lane is decreased after the particular intersection.

According to the above-described structure, since the ramp judgment means judges as the above ways, the travel guidance is adequately performed to the branch point, which is not judged as the intersection to be guided only by the "Following-the-road judgment".

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

FIG. 3 is a flowchart illustrating a route guidance process executed by the vehicular navigation system;

DESCRIPTION OF THE PREFERRED EMBODIMENTS

A preferred embodiment adopting the present invention will be explained with reference to the accompanying drawings. Here, the present invention should not be limited to the following embodiments and modifications. For instance, the present invention may be modified in various ways without departing from the spirit of the invention.

Figure 1:
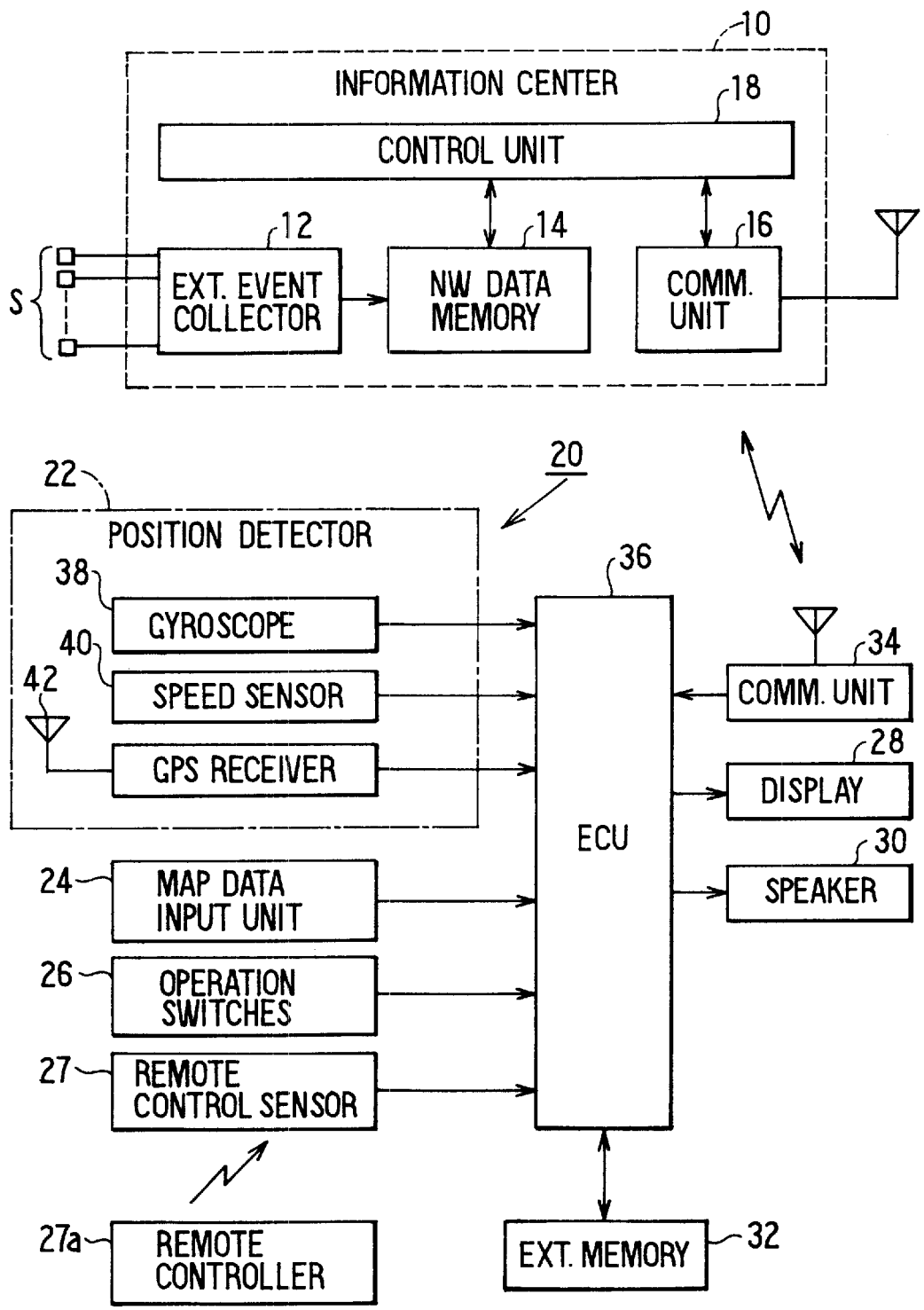
FIG. 1 is a schematic block diagram illustrating entire construction of a vehicular navigation system of a preferred embodiment according to the present invention.

FIG. 1 is a schematic block diagram illustrating whole construction of a vehicular navigation system 20 of this embodiment. The vehicular navigation system 20 is provided with a position detector 22, a map data input unit 24, operation switches 26, a remote control sensor 27, a display unit 28, a speaker 30, an external memory 32, a communication unit 34 and an electronic control unit (ECU) 36.

The position detector 22 has a gyroscope 38, a vehicle speed sensor 40 and a GPS receiver 42 for GPS (Global Positioning System), which detects a present position of the vehicle based on radio from the satellite. Since each of these sensors 38, 40, 42 has tolerance different from each other, these sensors are used by interpolating with plural sensors. Here, the position detector 22 may employ only one of the above-described sensors when accuracy is satisfied. On the contrary, an earth magnetism sensor, a steering angle sensor or wheel sensors for each wheel may be used in addition to the above-described sensors 38, 40, 42.

The map data input unit 24 inputs map data stored in a memory (storing medium). Here, the map data includes data showing connecting condition of roads (road network data), map-matching data for improving position detection accuracy, and so on. The storing medium for storing the map data can be selected from CD-ROM or DVD because of its amount of data; however, the other medium such as memory cards may be used.

Here, there are three formats in the road network data, that is, link data, node data and link-connection data. The link data includes "link ID" which is a unique number to specify the link; "link class" to identify the kind of road such as a highway, a toll road, a normal road, an on-ramp, or an off-ramp; "start coordinates" and "end coordinates" of the link; and data concerning link itself such as "link length" indicating a length of the link and so on. On the contrary, the node data includes "node ID" which is a unique number of the node connecting the links; data indicating "No right/left turn" at an intersection and existence or not of signal, and so on. Furthermore, the link-connection data includes data indicating whether a travel is permitted or prohibited due to, for example, a one-way road. Here, even if the link is the same, when the road is the one-way road, a travel from one link is permitted, however, a travel from another link is permitted. Therefore, whether the travel is permitted or prohibited depends on a connecting condition between the links.

The operation switches 26 consist of some kinds of switches for operating the vehicular navigation system 20, specifically, a switch for changing a display contents to be displayed on the display unit 28 or a switch for setting a route to a destination (recommended guidance route) by users. Here, the some kinds of switches may be selected from a touch switch integrated with the display unit 28 or mechanical switches.

The remote control sensor 27 inputs signal from a remote controller 27a, which is provided with several switches through which the user inputs each command. The user can input the same command through remote controller 27a as that he/she uses the operation switches 26.

The display unit 28 is a color display unit, and is capable of displaying plural information including: a vehicle present position mark inputted from the position detector 22; the map data inputted from the map data input unit 24; and additional data such as a guidance route or a land mark of a setting point, by superimposing each other.

The speaker 30 performs the route guidance to the driver by using voice sound. In this embodiment, the route guidance for the driver can be performed by both the display of the display unit 28 and the voice sound from the speaker 30. For example, in the case of a turning-right, the vehicular navigation system 20 outputs the voice sound such as "Please turn right at next intersection". When the driver is informed by using the voice sound, the driver can drive more safely because the driver can obtain traffic information at the set point without moving his/her eyes.

The external memory 32 stores a route set by the ECU 36. The stored data is backed-up by not-shown power supply.

The communication unit 34 receives information provided from an external information center 10 such as VICS (Vehicle Information and Communication System), and transmits information to external. The information externally received via the communication unit 34 is processed by the ECU 36. Here, a unit used as the communication device 34 can be selected from a movable communication device such as an automobile phone, a cellular phone, or a dedicated receiver.

The ECU 36 is made up of a normal computer system, and is provided therein with a CPU, a ROM, a RAM, an I/O and a bus line connecting these components. The ECU 36 controls the display unit 28, the speaker 30, the external memory 32 and the communication unit 34 based on inputs from the position detector 22, the map data input unit 24, the operation switches 26, and the remote control sensor 27, and executes processes including the route setting and route guidance.

Here, system of the information center 10 will be briefly explained.

The information center 10 is constructed from an external event collector 12, a road network data memory 14, a communication unit 16 and a control unit 18. The external event collector 12 collects external event information such as traffic condition from plural kinds of sensors S or the like provided closed to road (street). The road network data memory 14 stores road map data within a center area and plural kinds of traffic information, which is generated based on plural kinds of traffic regulations or external events collected by the external event collector 12. The communication unit 16 communicates with the vehicular navigation system 20 via wireless communication such as an automobile phone or a cellular phone. The control unit 18 is a main unit for performing a control, and specifies the traffic regulation and traffic congestion information of the particular roads based on the position data (present position and destination) received from the vehicular navigation system 20 and information stored in the road network data memory 14, and further transmits the specified traffic regulation and traffic congestion information via the communication unit 16.

The vehicular navigation system 20 constructed this way operates as follows. That is, after the driver inputs the destination by operating the operation switches 26, the ECU 36 automatically sets the most adequate recommended guidance route from the present position to the destination (route setting) and performs the guidance by displaying on the display unit 28 and outputting voice sound from the speaker 30 (route guidance).

The route setting of the ECU 36 is performed as follows. That is, after the driver inputs the destination based on the map on the display unit 28, the ECU 36 calculates the present position of the vehicle based on the satellite data received via the GPS receiver 42. After that, the ECU 36 calculates the cost between the present position and the destination by using the Dijkstra's algorithm, and determined the shortest route or a minimum-cost route between the present position and the destination as the guidance route. Finally, the ECU 36 displays the guidance route on the display unit 28 by superimposing with the road map so as to guide an adequate route to the driver. In this guidance, "intersection guidance" is performed. The intersection guidance guides how to pass through an intersection to be guided at every time the vehicle approaches the intersection to be guided existing on the recommended guidance route. Here, the "intersection to be guided" is a particular intersection, which is judged so that it needs to perform travel guidance in view of a shape of the road or surrounding condition.

In this embodiment, there are mainly two types of judgments to judge whether it is the intersection to be guided or not. That is, the "Following-the-road judgment", which has been applied to the navigation system, and a "ramp judgment", which is newly applied in this embodiment. These two judgments will be explained hereinafter.

(1) Following-the-road Judgment

According to this judgment, whether a continuity of the traveling road between before and after the intersection is secured or not is mainly considered, when the vehicle passes through the intersection (particular intersection) on the recommended guidance route. For example, in the case where another road is substantially perpendicularly crosses to one road, which is linearly extended, and the vehicle travels along this one road, and when the recommended guidance route is determined so that the vehicle straightly travels on this one road, the intersection of these one and another roads is not judged as the intersection to be guided, because the vehicle merely passes through this intersection.

Furthermore, the road may be judged as the "Following-the-road", even when the vehicle is not permitted to go straight and is compulsory turned to one of right and left at the intersection. For example, in the case where a narrow road intersects with a wide road and when the recommended guidance route is determined so that the vehicle straightly travels on this wide road, the road is judged as the "Following-the-road", because the user merely keeps on traveling the road on which the user has been traveled. This judgment is concerned with the link class such as a difference between the wide road and the narrow road. As described the above, the link class is set in the road network data, which is inputted from the memory (storing means) via the map data input unit 24.

Figure 6:
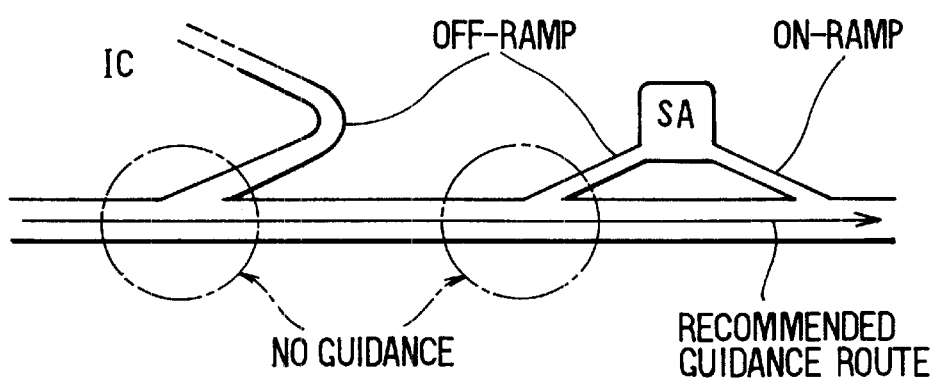
FIG. 6 is a diagram illustrating off-ramps, each of which is not judged as an intersection to be guided in a Following-the-road judgment.

Now, an example of the Following-the road judgment using this link class will be considered. In this case, as shown in FIG. 6, the off-ramp and on-ramp are connected to the main lane of the highway or the automobile specialized road. The on-ramp or the off-ramp is connected to the IC, the SA, or the PA. In the Following-the-road judgment, the ramp is treated as less important road compared to the main lane of the highway or the automobile specialized road. In other words, when the recommended guidance route is determined so that the vehicle travels on the main lane, each of the ramps is not judged as the intersection to be guided even if the off-ramp is connected. In general, when the vehicle enters the off-ramp, the user needs to intentionally drive the vehicle toward the off-ramp from the main lane. Therefore, in the case where the recommended guidance route is determined so that the vehicle travels to actually "Follow-the-road", the user may be confused if the travel guidance is performed at every time the vehicle approaches the IC or the SA.

(2) Ramp Judgment

This judgment relates to "off-ramp separating from the main lane", whose intersection with the main lane is not judged as the intersection to be guided in the Following-the-road judgment described in (1), and is performed to judge whether some travel guidance is needed due to the road's unique shape.

According to this ramp judgment, when the intersection is a branch point at which the off-ramp is connected to the main lane so that the traffic is separated from the main lane, and when a merge point at which the on-ramp is connected to the main lane so that the traffic on the on-ramp is merged to the main lane, the ramp judgment judges the intersection (branch point) as the intersection to be guided. In this case, it is assumed that the recommended guidance route is determined so that the vehicle straightly travels on the main lane so as to, "Follow-the-road"; because when the recommended guidance route is determined so that the vehicle travels to the IC or the like via the off-ramp, the branch point is judged as "Not following-the-road" in the Following-the-road judgment in the (1), and is judged as the intersection to be guided.

A concrete example for the case where the off-ramp is judged as the intersection to be guided in the ramp judgment will be explained with reference to FIGS. 2A and 2B.

Figure 2A:
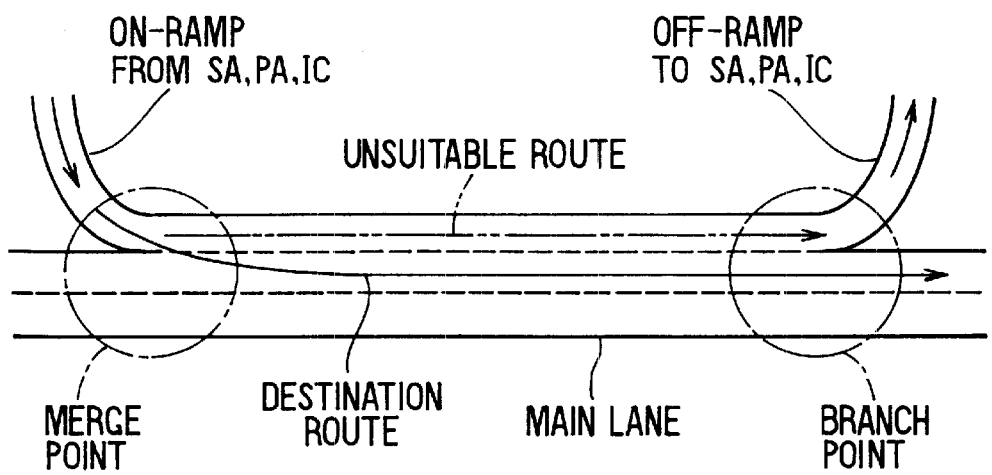
FIGS. 2A and 2B are diagrams illustrating examples, each of which is judged as an intersection to be guided in a ramp judgment.

As shown in FIG. 2A, when a merge point, at which an on-ramp from the SA or the PA is merged (connected) with a main lane, is provided close to a branch point, at which an off-ramp to the IC or the SA is branched from the main lane, it can be thought that the number of lanes is increased only between the merge point and the branch point. Normally, the road has a shape so that traffic on the increased lane is automatically merged to the main lane (the temporarily increased land is decreased again as shown in FIG. 2B). However, according to the above-described example, since the number of lanes is not decreased, the vehicle can continue traveling in the increased lane.

Therefore, when the recommended guidance route is determined so that the vehicle travels on the main road, the merge point, which exists within a predetermined distance, is judged as the intersection to be guided.

Although each judgment regarding the intersection to be guided has been explained by using schematic diagrams, processes executed by the electronic control unit (ECU) 36 will be explained hereinafter.

At first, a summary of the route guidance will be explained with reference to a flowchart shown in FIG. 3.

At step S10, the ECU 36 calculates a present position of the vehicle based on data obtained by the position detector 22. At step S20, the ECU 36 judges whether the calculated present position meets a condition for performing the route guidance. When the condition for performing the route guidance exists (S20:YES), the ECU 36 moves to step S30 to perform the travel guidance. When the condition does not exist (S20:NO), the ECU 36 moves to step S40.

After the ECU 36 performs the guidance at step S30, the ECU 36 moves to step S40 to judge whether a route calculation is performed or not. When the route calculation is performed (S40:YES), the ECU 36 moves to step S50 to make guidance data, and returns to step S10. When the route calculation is not performed (S40:NO), the ECU 36 directly returns to step S10.

Here, the making guidance data process at step S50 will be explained with reference to a flowchart shown in FIG. 4. As can be understood from FIG. 3, a making of the guidance data is performed after the route calculation, and makes data for travel guidance for guiding the user to the destination based on the calculated recommended guidance route.

Figure 4:
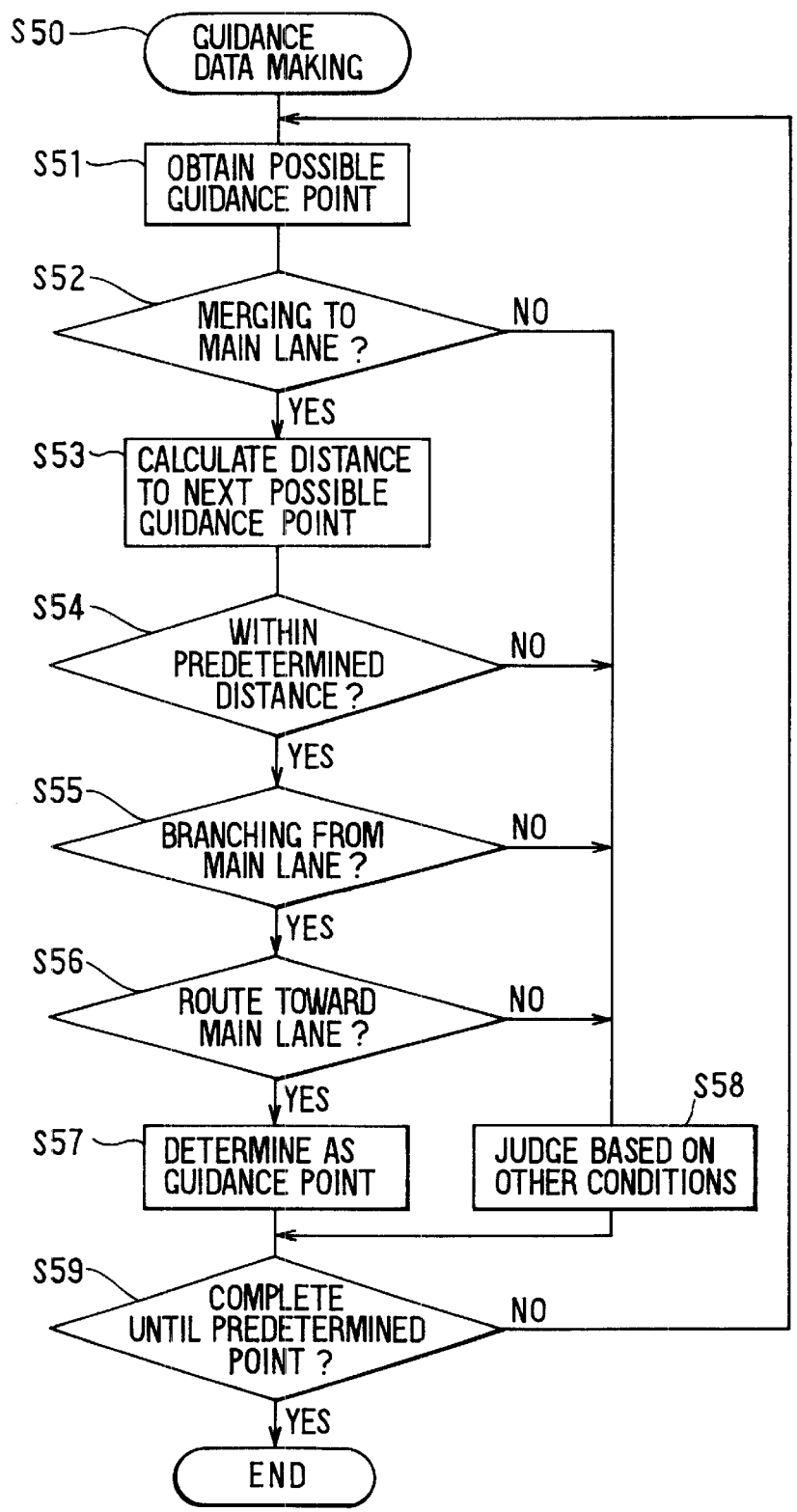
FIG. 4 is a flowchart illustrating a guidance data making process in FIG. 3 executed by the vehicular navigation system.

In FIG. 4, at step S51, the ECU 36 obtains data as a possible guidance point at which the route guidance is to be performed. In this case, all of the intersections are regarded as the possible guidance point.

At the following step S52, the ECU 36 judges whether the possible guidance point is the merge point to the main lane or not. This judgment is performed based on the link data (link class, etc) in the road network data and the link-connection data (a permitted travel direction, etc).

When it is not the merge point (S52: NO), the ECU 36 moves to S58 to judge based on the other conditions. This is based on the regular Following-the-road judgment.

On the contrary, when it is the merge point (S52: YES), the ECU 36 calculates a distance to a next possible guidance point on the recommended guidance route (step S53). After that, the ECU 36 judges whether the calculated distance is within a predetermined distance or not (step S54). When it is within the predetermined distance (S54: YES), the ECU 36 judges whether the next possible guidance point is the branch point, at which the off-ramp is branched from the main lane (step S55). In other words, the ECU 36 judges whether a portion, at which the off-ramp to IC, the SA, or the PA is connected to the main lane, is the branch point from the main lane as is discussed the above. This judgment is performed based on the link data (link class, etc) in the road network data and the link-connection data (a permitted travel direction, etc).

Furthermore, when the next possible guidance point is the branch point to the off-ramp (S55: YES), the ECU 36 judges whether the determined recommended guidance route includes a route, on which the vehicle further travels the main lane passing the branch point, or not (step S56). When the determined recommended guidance route includes such the route (S56: YES), the ECU 36 sets this branch point as the intersection to be guided (step S57).

Here, when the ECU 36 makes a negative judgment at one of the steps S54–56, the ECU 36 moves to step S58 to judge based on the other conditions, which is based on the regular Following-the-road judgment. In other words, the ECU 36 perform the regular Following-the-road judgment at step S58: when the calculated distance from the merge point to the next possible guidance point is longer than the predetermined distance (S54: NO); when the next possible guidance point is not the branch point, at which the off-ramp is branched from the main lane (e.g., that is the merge point) (S55: NO); or when the determined recommended guidance route does not include the route, on which the vehicle further travels the main lane passing the branch point (e.g., the recommended guidance route includes a route to enter the off-ramp) (S56: NO). In other words, when all of the judgments (steps S52, S54, S55, S56) are affirmative (ascertained) the ECU 36 regards the branch point as the intersection to be guided.

After step S57 or S58, the ECU 36 moves to step S59 to judge whether all the guidance data until a predetermined point have been made or not. When they have not been made (step S59: NO), the ECU 36 returns to step S51 to repeat processes. Here, the predetermined point is, for example, the destination. When they have been made until the predetermined point (S59: YES), the ECU 36 terminates the guidance data making process.

When the ECU 36 judges that the calculated present position meets with a condition for performing the route guidance (S20: YES), the ECU 36 performs the predetermined travel guidance based on the made guidance data (S30).

The contents of this travel guidance will be further explained.

The travel guidance is performed at timing when the distance to the intersection to be guided becomes a predetermined distance. This timing is determined based on the kind of the link. That is, the predetermined distance of the highway is set longer than that of a normal road; and the wider the road is, the longer the predetermined distance is determined. However, when a speed limit is set lower although the road is wide, the predetermined distance may be determined relatively short. These determinations of the predetermined distance are based on a viewpoint that it is preferable to perform the route guidance before adequate distance from the intersection to be guided, when the route guidance regarding the intersection to be guided is adequately performed. Here, the predetermined distance is determined to, for example, 500 meters ahead in the case of the highway; and 100 meters ahead in the case of the normal road.

Here, the guidance may be performed plural times regarding the same intersection to be guided. For example, the guidance may be performed at three times at 2 kilometers ahead, 1 kilometers ahead, and 500 meters ahead in the case of the highway; and may be performed at 700 meters ahead, 300 meters ahead, and 100 meters ahead. In this case, the travel guidance may be includes distance to the intersection and the direction to be turned with voice sound such as "After ◯ ◯ meters, please turn to the right" at first two guidance, and may be performed at the last timing to guide (e.g., 500 meters ahead in the case of the highway, and 100 meters ahead in the case of the normal road) with voice sound such as "Soon, please turn to the right."

The content of the guidance is not limited to the direction to be turned. Regarding the branch point, which is determined as the intersection to be guided at step S57 in FIG. 4, the travel guidance is performed such that the vehicle keeps on traveling straightly to follow the road, without turning at the branch point, with voice sound such as "Soon, you will find a branch. Please travel on a main lane." based on the calculated recommended guidance route.

As described the above, the vehicular navigation apparatus 20 of this embodiment specifies the intersection to be guided by basically using the regular "Following-the-road judgment" for intersections existing on the recommended guidance route, and performs the predetermined travel guidance at every time the vehicle approaches the intersection to be guided. Furthermore, the vehicular navigation apparatus 20 of this embodiment can specify the particular intersection as the intersection to be guided based on the ramp judgment, even if the particular intersection is not judged as the intersection to be guided in the "Following-the-road judgment". That is, as shown in FIGS. 2A and 2B, in the case where there is the branch point at which off-ramp is connected to the main lane, and when there is the merge point at which the on-ramp is connected to the main lane within the predetermined distance from the branch point, the ECU 36 regards the branch point as the intersection to be guided and performs the predetermined travel guidance.

Figure 2B:
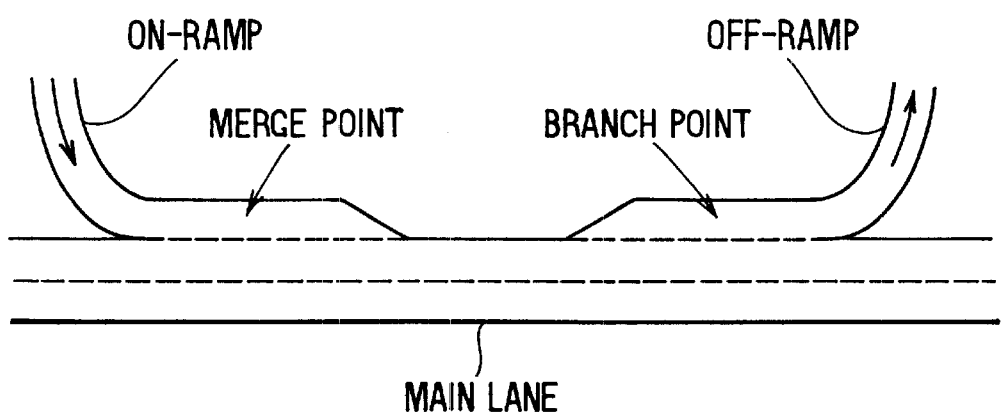

Therefore, the travel guidance is adequately performed to the branch point shown in FIGS. 2A and 2B, which is not judged as the intersection to be guided only by the "Following-the-road judgment". That is, the travel guidance is performed with voice sound such as "Soon, you will find a branch at left side. Please depart from the far left lane, and travel on a main lane", when the vehicle is merged into the main lane from the on-ramp from the SA etc and when the vehicle approaches the branch point to the IC etc.

Here, in the guidance data making process in FIG. 4, the steps S52–S57 correspond to the "Ramp judgment", and the step S58 corresponds to the "Following-the-road judgment". It does not matter which judgment is prior itized among the "Following-the-road judgment" and the "Ramp judgment". In this embodiment, the "Ramp judgment" is prioritized. That is, the ECU 36 of this embodiment firstly judges whether the possible guidance point on the recommended guidance route is the merge point or not (step S52); the ECU 36 judges whether there is the branch point within the predetermined distance (steps S54 and S55) when only the possible guidance point is the merge point (S52: YES). In other words, since the ECU 36 does not judge the branch point to be the intersection to be guided unless the ECU 36 recognizes the merge point, useless processes for performing the "Ramp judgment" can be substantially omitted and it can improve process efficiency.

[Modification]

(1) In FIGS. 2A and 2B, the number of the lanes decreases at the branch point. In the case where there is the branch point, and when the number of the lanes is not changed before and after the branch point, the vehicle can travel the main lane without positively changing the lane. The road to be considered in this embodiment is that where the number of the lanes decreases at the branch point. Therefore, in the guidance data making process shown in FIG. 4, a first lane number judgment step for judging whether the number of the lanes decreases at the branch point may be added, so that the ECU 36 determines a particular branch point as the intersection to be guided only when the ECU 36 judges that the number of the lanes decreases at the particular branch point.

(2) As shown in FIG. 2B, even if the branch point is provided close to the merge point, the number of the lanes is not always increased only between the merge point and the branch point. Therefore, in the guidance data making process shown in FIG. 4, a second lane number judgment step for judging whether, the number of the lanes is increased only between the merge point and the branch point may be added, so that the ECU 36 determines a particular branch point as the intersection to be guided only when the ECU 36 judges that the number of the lanes is increased only between the merge point and the branch point. In this case, this judgment can be performed based on data regarding the number of the lanes in the link data.

(3) Here, FIGS. 2A and 2B show typical examples. There are the other kinds of intersections, at which they are not judged as the intersections to be guided in the regular "Following-the-road judgment" but some travel guidance is needed because each road has unique shape, other than the above-described example using the distance between the merge point and the branch point. Therefore, for example, the ECU 36 may judge the intersection to be guided based on a condition that the number of the lanes decreases after the branch point.

Here, even if there is no merge point just before (within the predetermined distance from) the branch point, when the number of the lanes decreases at the branch point, the lane which leads to the main lane is restricted. It is preferable for the navigation system to cope with such a situation.

Figure 5:
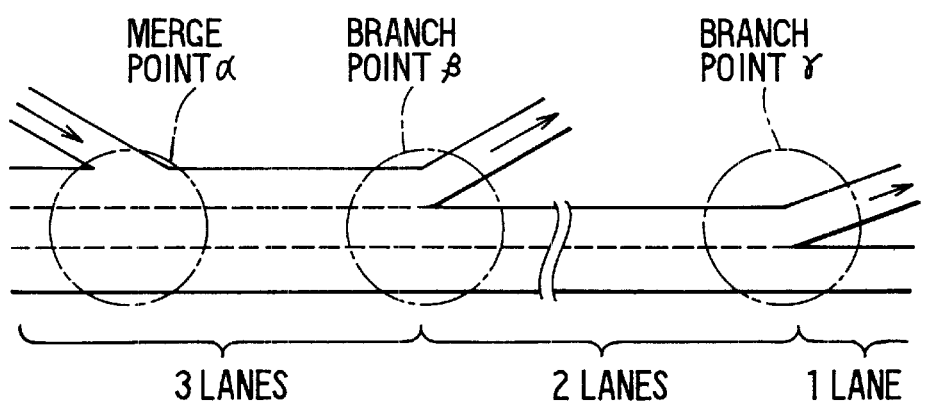
FIG. 5 is a diagram illustrating another example, which is judged as an intersection to be guided in a ramp judgment.

Here, as shown in FIG. 5, it is assumed that: an on-ramp is connected to a main lane at a merge point α; there is a first branch point β, at which the number of the lanes decreases from three to two, when a vehicle from the on-ramp travels based on a recommended guidance route; and there is a second branch point γ, at which the number of the lanes decreases from two to one. In this case, since a distance between the second branch point γ and the merge point α is long, it is difficult for the ECU 36 to judge the second branch point γ as the intersection to be guided based on the distance between the merge point and the branch point. Therefore, the ECU 36 judges whether the number of the lanes decreases at the branch point, based on the lane number data in the link data. When there commended guidance route is determined so that the vehicle keeps on traveling the main lane, the ECU 36 performs the adequate travel guidance regarding the branch point. The guidance may be performed plural times regarding to the same intersection to be guided. For example, the guidance may be performed at three times at 2 kilometers ahead, 1 kilometers ahead, and 500 meters ahead in the case of the highway; and may be performed at 700 meters ahead, 300 meters ahead, and 100 meters ahead.

Here, this judgment of the decreasing of the number of the lanes may be combined with the above-described "Following-the-road judgment" and the "Ramp judgment", or may be independently performed from these judgments. That is, the ECU 36 may judge the intersection to be guided only based on a condition that the number of the lanes decreases after the branch point. As a result, the vehicle can successfully move to one of the main lanes before the first branch β; and even when the vehicle keeps on traveling a outer side lane (Left side lane in FIG. 5), the vehicle can be adequately guided to the main lane before the second branch point γ.

(4) Here, in the above embodiment, an on-ramp, which merges the traffic to the main lane at the merge point provided within the predetermined distance from the off-ramp, which branches the traffic to from the main lane, is exemplified by the particular on-ramp from the SA, the PA, or the IC. However, the on-ramp can be replaced with anther main lane to merge the traffic on said another main lane to the main lane, or off-ramp can be replaced with an off-ramp to the still another main lane (junction).

Here, the present position detection described the above can be realized by, for example, a program which is to be read and executed by a computer system. In such a case, the program is readably recorded in a recording medium such as a floppy disk, a magneto-optic disk, CD-ROM, and a hard disk, and is loaded onto the computer system and is initialized thereon. Furthermore,the program may be recorded in a ROM, a back-up RAM as the recording medium readable by the computer system, and may be executed by mounting the ROM or the back-up RAM into the computer system.

What is claimed is:

1. A navigation system comprising:
    following-the-road judgment means for judging whether a continuity of a travel road is secured before and after a particular intersection when a vehicle passes through the particular intersection existing on a recommended guidance route, and for determining the particular intersection as an intersection to be guided when the continuity of the travel road is not secured;
    ramp judgment means for, even when the particular intersection is not determined as the intersection to be guided by the following-the-road means, determining the particular intersection as the intersection to be guided, when the particular intersection is a branch point at which an off-ramp is connected to a main lane to divide traffic on the main lane to the off-ramp, and when there is a merge point at which traffic is merged to the main lane within a predetermined distance ahead of the branch point, and further when the recommended guidance route is set so that the vehicle continues to travel on the main lane;
    travel guidance performing means for performing travel guidance regarding the intersection to be guided, which is determined by one of the following-the-road judgment means and the ramp judgment means, when the vehicle approaches the intersection to be guided;
    wherein the ramp judgment means first judges whether a certain intersection on the recommended guidance route is the merge point or not, and
    when the certain intersection is the merge point, the ramp judgment means uses another particular intersection existing within the predetermined distance on the recommended guidance route from the certain intersection as a possible particular intersection to be judged.

2. A navigation system according to claim 1, wherein the ramp judgment means determines the particular intersection as the intersection to be guided, only when the number of lanes including the main lane is decreased after the particular intersection.

3. A navigation system according to claim 2, wherein the ramp judgment means determines the particular intersection as the intersection to be guided, only when the number of lanes including the main lane is increased only between the on-ramp and the off-ramp.

4. A navigation system comprising:
    following-the-road judgment means for judging whether a continuity of a travel road is secured before and after a particular intersection when a vehicle passes through the particular intersection existing on a recommended guidance route, and for determining the particular intersection as an intersection to be guided when the continuity of the travel road is not secured;
    ramp judgment means for, even when the particular intersection is not determined as the intersection to be guided by the following-the-road judgment means, determining the particular intersection as the intersection to be guided, when the particular intersection is a branch point at which an off-ramp is connected to a main lane to divide traffic on the main lane to the off-ramp, and further when the number of lanes including the main lane is decreased after the particular intersection, and when there is a merge point at which traffic is merged to the main lane within a predetermined distance ahead of the branch point;
    travel guidance performing means for performing travel guidance regarding the intersection to be guided, which is determined by one of the following-the-road judgment means and the ramp judgment means, when the vehicle approaches the intersection to be guided;
    wherein the ramp judgment means firstly judges whether a certain intersection on the recommended guidance route is the merge point or not, and when the certain intersection is the merge point, the ramp judgment means uses another particular intersection existing within the predetermined distance on the recommended guidance route from the certain intersection as a possible particular intersection to be judged.

5. A navigation system according to claim 1, wherein the travel guidance performing means performs the travel guidance by a using voice sound generation apparatus.

6. A navigation system according to claim 5, wherein the travel guidance performing means performs the travel guidance by further using a display unit for displaying characters and images.

7. A navigation system comprising:

following-the-road judgment means for judging whether a continuity of a travel road is secured before and after a particular intersection when a vehicle passes through the particular intersection existing on a recommended guidance route, and for determining the particular intersection as an intersection to be guided when the continuity of the travel road is not secured;

a ramp judgment portion for judging whether the particular intersection is a branch point at which an off-ramp is connected to a main lane to divide traffic on the main lane to the off-ramp, for judging whether there is a merge point at which traffic is merged to the main lane within a predetermined distance ahead from the branch point, for judging whether the recommended guidance route is set so that the vehicle keeps on traveling on the main lane, and for determining the particular intersection as the intersection to be guided when all of the above three judgments are affirmed; and a travel guidance portion for outputting travel guidance signal regarding the intersection to be guided, which is determined by one of the following-the-road judgment means and the ramp judgment means.

8. A navigation method comprising:

ascertaining that a first possible guidance point on a recommended guidance route is a merge point to a main lane;

ascertaining that a distance from the first possible guidance point to a second possible guidance point on a recommended guidance route is within a predetermined distance;

ascertaining that the second possible guidance point is a branch point;

ascertaining that the determined recommended guidance route includes a particular route on which the vehicle continues to travel on the main lane and passes the branch point; and performing travel guidance regarding the second possible guidance point.

9. A navigation method comprising:

obtaining data of a first and a second possible guidance points on a recommended guidance route;

judging whether the first possible guidance point is a merge point to a main lane;

calculating a distance from the first possible guidance point to the second possible guidance point, when the first possible guidance point is the merge point;

judging whether the calculated distance is within a predetermined distance;

judging whether the second possible guidance point is a branch point, when the calculated distance is within the predetermined distance;

judging whether the determined recommended guidance route includes a particular route, on which the vehicle further travels the main lane passing the branch point, when the second possible guidance point is the branch point;

determining the second possible guidance point as the intersection to be guided, when the determined recommended guidance route includes the particular route; and performing travel guidance regarding the intersection to be guided.

10. A navigation method according to claim 9, further comprising:

obtaining data of a third possible guidance point on the recommended guidance route;

calculating a distance from the first possible guidance point to the third possible guidance point when the first possible guidance point is the merge point;

judging whether the third possible guidance point is an additional branch point; and judging in which particular lane the vehicle travels based upon the data from the first, second and third guidance points.

* * * * *